United States Patent
Kim et al.

(10) Patent No.: US 12,130,428 B2
(45) Date of Patent: Oct. 29, 2024

(54) HEAD-UP DISPLAY MIRROR WITH IMPROVED SURFACE AND EDGE QUALITY AND METHODS FOR FORMING THE SAME

(71) Applicant: CORNING INCORPORATED, Corning, NY (US)

(72) Inventors: Bong Chul Kim, Asan-si (KR); Jong Hwa Kim, Cheonan-si (KR)

(73) Assignee: CORNING INCORPORATED, Corning, NY (US)

( * ) Notice: Subject to any disclaimer, the term of this patent is extended or adjusted under 35 U.S.C. 154(b) by 689 days.

(21) Appl. No.: 17/296,738

(22) PCT Filed: Nov. 25, 2019

(86) PCT No.: PCT/KR2019/016290
§ 371 (c)(1),
(2) Date: May 25, 2021

(87) PCT Pub. No.: WO2020/111698
PCT Pub. Date: Jun. 4, 2020

(65) Prior Publication Data
US 2021/0396997 A1    Dec. 23, 2021

Related U.S. Application Data

(60) Provisional application No. 62/771,877, filed on Nov. 27, 2018.

(51) Int. Cl.
*G02B 27/01* (2006.01)
*G02B 1/00* (2006.01)
(Continued)

(52) U.S. Cl.
CPC ......... *G02B 27/0101* (2013.01); *G02B 1/002* (2013.01); *G02B 5/0808* (2013.01);
(Continued)

(58) Field of Classification Search
CPC ..... C03C 17/00; C03C 17/004; C03C 17/005; C03C 17/09; C03C 1/00; C03C 1/008;
(Continued)

(56) References Cited

U.S. PATENT DOCUMENTS 8,746,011 B2 *   6/2014   Balduin ............... C03B 23/0357
                                                65/106
11,768,369 B2 *  9/2023   Kim .................... C03B 23/0357
                                                428/192
(Continued)

FOREIGN PATENT DOCUMENTS

EP   3104212 A2    12/2016
JP   2004-101829 A  4/2004
(Continued)

OTHER PUBLICATIONS

Chinese Patent Application No. 201980086983.6, Office Action dated Dec. 16, 2022, 4 pages (English Translation only), Chinese Patent Office.
(Continued)

*Primary Examiner* — Sultan Chowdhury
(74) *Attorney, Agent, or Firm* — William M. Johnson; Frank Brock Riggs; Payal A. Patel

(57) ABSTRACT

A head-up display (HUD) mirror that includes a mirror substrate with a first major surface with a concave shape, a second major surface opposite to the first major surface and with a convex shape, and a minor surface connecting the first and second major surfaces. The HUD mirror also a reflective layer disposed on the first major surface. The first major surface has a first surface roughness Ra of 3 nm or less and a peak to valley (PV) roughness of less than 30 nm, and the mirror substrate is a glass or glass-ceramic material.

18 Claims, 9 Drawing Sheets

(51) Int. Cl.
  *G02B 5/08* (2006.01)
  *G02B 5/10* (2006.01)
  *B60K 35/23* (2024.01)
  *B60K 35/60* (2024.01)

(52) U.S. Cl.
  CPC .............. *G02B 5/10* (2013.01); *B60K 35/23* (2024.01); *B60K 35/60* (2024.01); *B60K 2360/23* (2024.01); *G02B 2027/013* (2013.01)

(58) Field of Classification Search
  CPC  C03C 1/024; C03C 1/10; C03C 27/00; C03C 27/02; C03C 27/04; C03C 27/06; C03C 27/042; C03C 27/044; C03C 27/048; C03C 27/10; C03C 213/002; G02B 27/01; G02B 27/0101; G02B 27/017; G02B 27/0172; G02B 27/0983; G02B 5/00; G02B 5/0808; G02B 5/10; B60K 2370/23; B60K 2370/1529; Y02P 40/57; C03B 23/00; C03B 23/0026; C03B 23/0066; C03B 23/023; C03B 23/03; C03B 23/0302; C03B 23/0357; C03B 33/04
  See application file for complete search history.

(56) References Cited

U.S. PATENT DOCUMENTS

| | | | |
|---|---|---|---|
| 2007/0219760 A1* | 9/2007 | Yang | G02B 19/0033 703/1 |
| 2008/0030836 A1* | 2/2008 | Tonar | G02F 1/157 359/275 |
| 2012/0144866 A1 | 6/2012 | Liu et al. | |
| 2013/0081428 A1 | 4/2013 | Liu et al. | |
| 2014/0234581 A1 | 8/2014 | Immerman et al. | |
| 2015/0370068 A1 | 12/2015 | Fujikawa et al. | |
| 2016/0039705 A1 | 2/2016 | Kato et al. | |
| 2016/0280590 A1* | 9/2016 | Kashima | C03C 21/00 |
| 2017/0190151 A1* | 7/2017 | Hamano | B32B 17/10788 |
| 2017/0235030 A1* | 8/2017 | Tanaka | G02B 27/0101 349/11 |
| 2017/0285338 A1 | 10/2017 | Narushima et al. | |
| 2018/0299674 A1* | 10/2018 | Aoki | G02B 27/108 |
| 2019/0358935 A1* | 11/2019 | Mitamura | C03C 27/10 |
| 2020/0147935 A1* | 5/2020 | Patrickson | B32B 17/10229 |
| 2020/0163244 A1 | 5/2020 | Ehemann et al. | |
| 2020/0278541 A1 | 9/2020 | Kim et al. | |
| 2020/0333594 A1 | 10/2020 | Chae et al. | |
| 2020/0385301 A1 | 12/2020 | Chae et al. | |

FOREIGN PATENT DOCUMENTS

| | | |
|---|---|---|
| JP | 2014-001123 A | 1/2014 |
| KR | 10-2003-0043625 A | 6/2003 |
| KR | 10-2014-0111403 A | 9/2014 |
| KR | 10-2015-0051458 A | 5/2015 |
| KR | 10-2015-0089151 A | 8/2015 |
| KR | 10-1550292 B1 | 9/2015 |
| KR | 10-2016-0118746 A | 10/2016 |
| TW | 201402477 A | 1/2014 |
| TW | 201840490 A | 11/2018 |
| WO | 2017/203916 A1 | 11/2017 |
| WO | 2020/111698 A1 | 6/2020 |
| WO | 2020/111828 A1 | 6/2020 |

OTHER PUBLICATIONS

Taiwanese Patent Application No. 108141900, Office Action dated Jul. 14, 2023, 5 pages (English Translation Only); Taiwanese Patent Office.
International Search Report and Written Opinion of the International Searching Authority; PCT/KR2019/016290; Mailed Mar. 9, 2020; 11 Pages; Korean Intellectual Property Office.
European Patent Application No. 19890580.4, Extended European Search Report, dated Jul. 21, 2022; 8 pages; European Patent Office.

* cited by examiner

[Fig. 1]
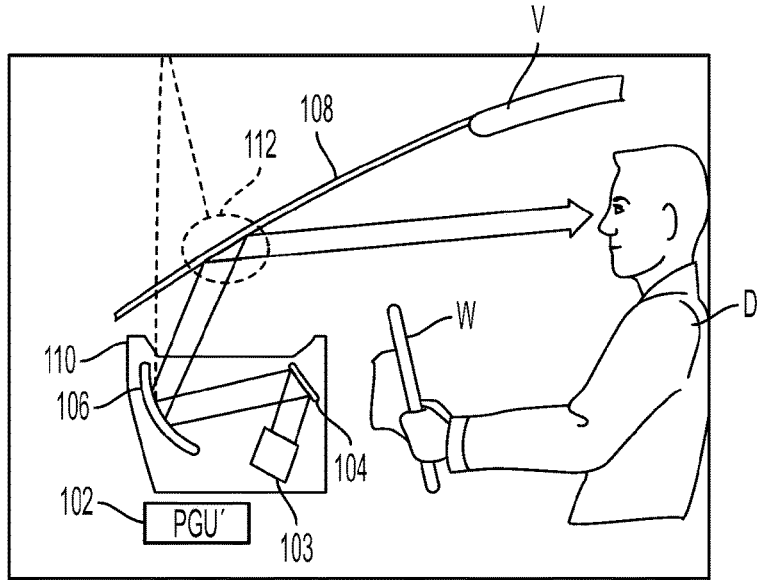
[Fig. 2]
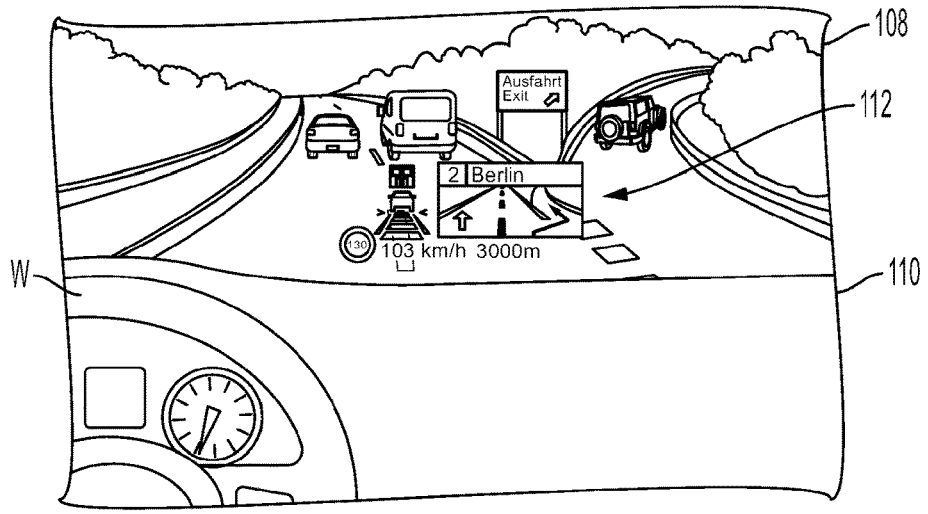
[Fig. 3]
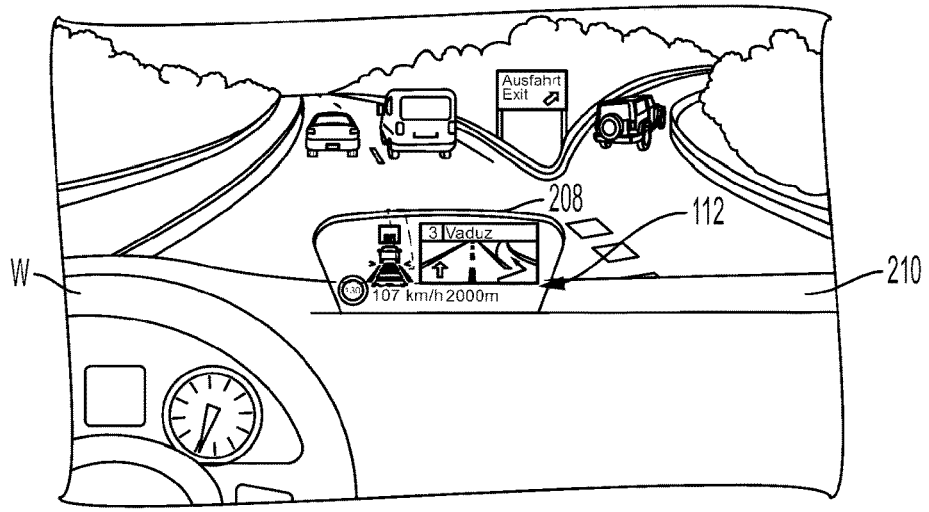

[Fig. 4]
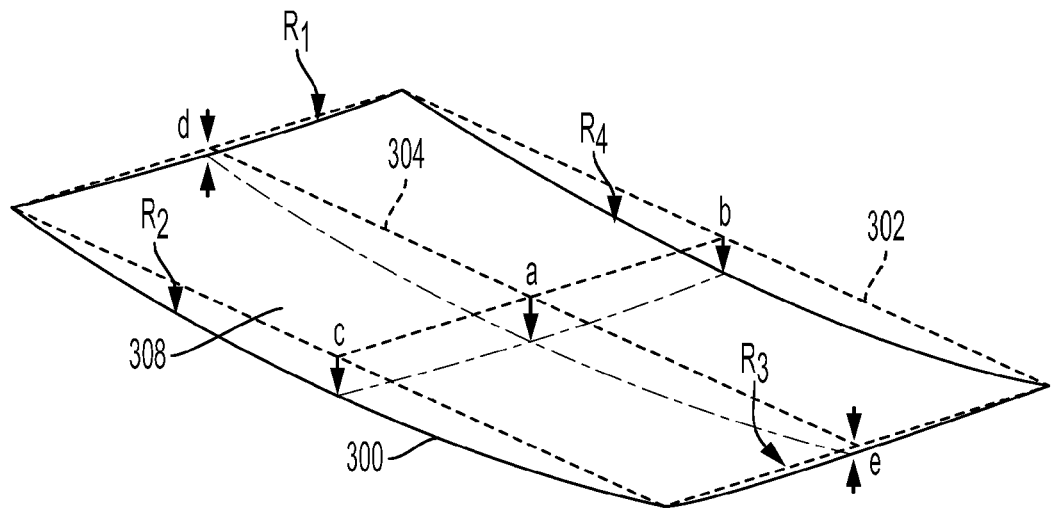
[Fig. 5]
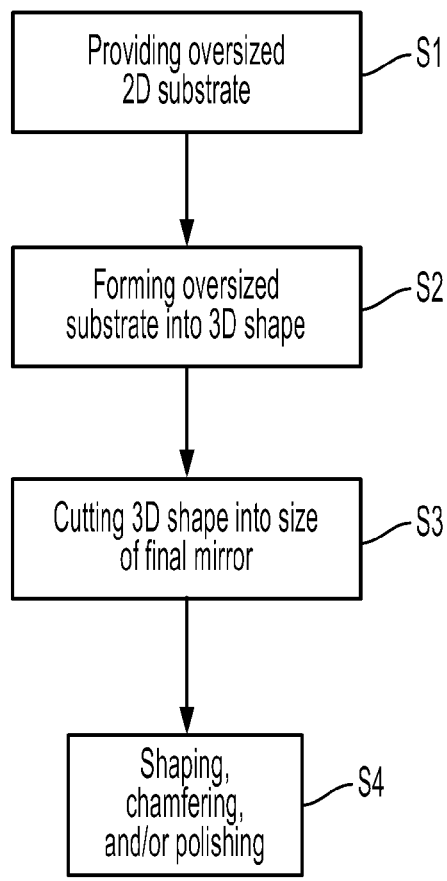

[Fig. 6]
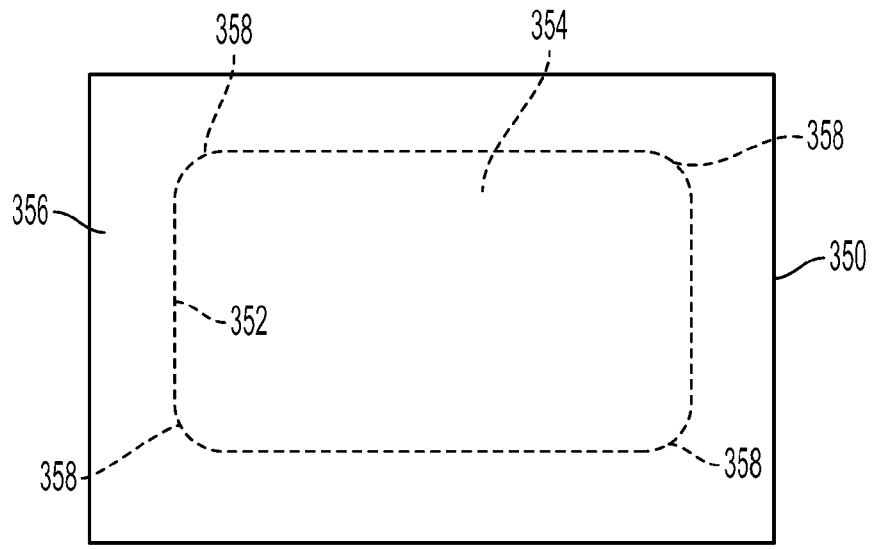
[Fig. 7]
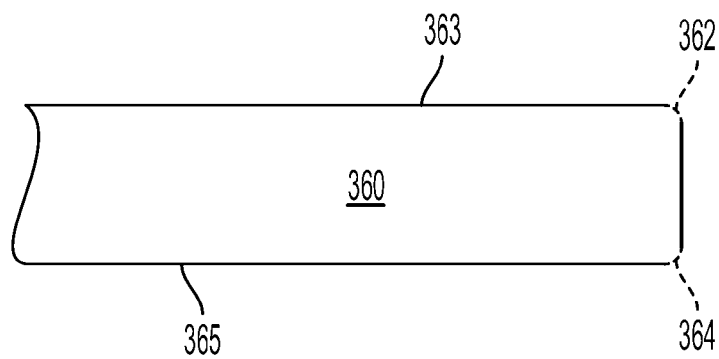
[Fig. 8]
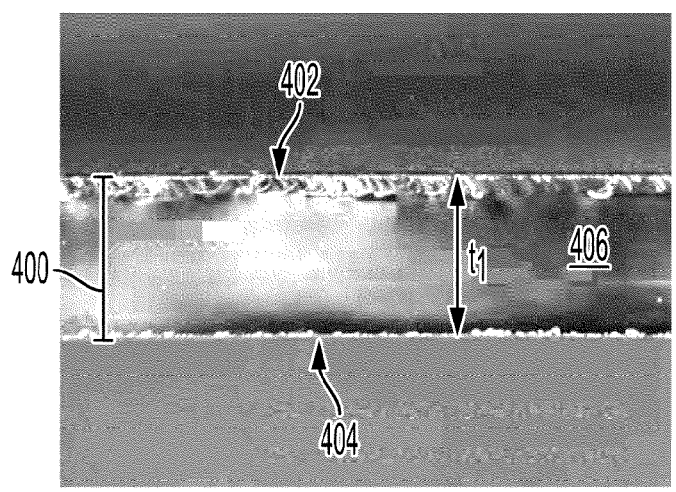

[Fig. 9A]
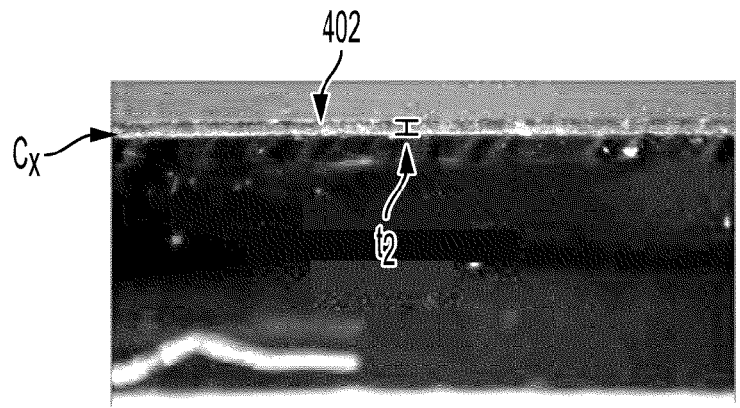
[Fig. 9B]
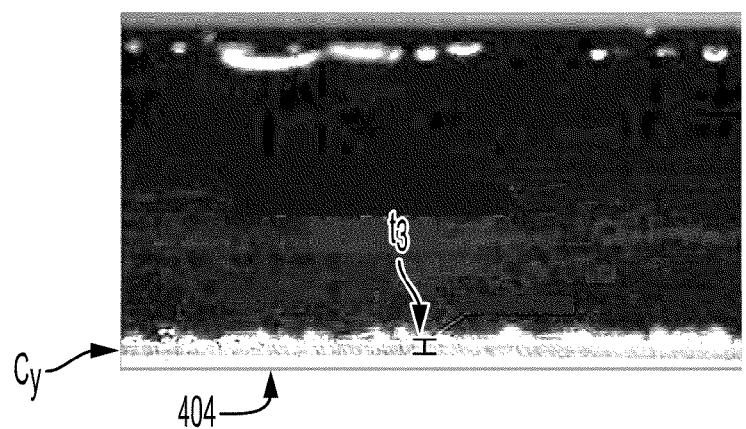
[Fig. 10A]
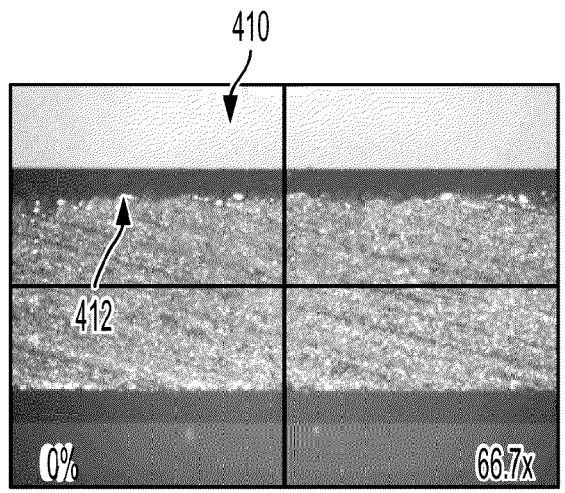

[Fig. 10B]
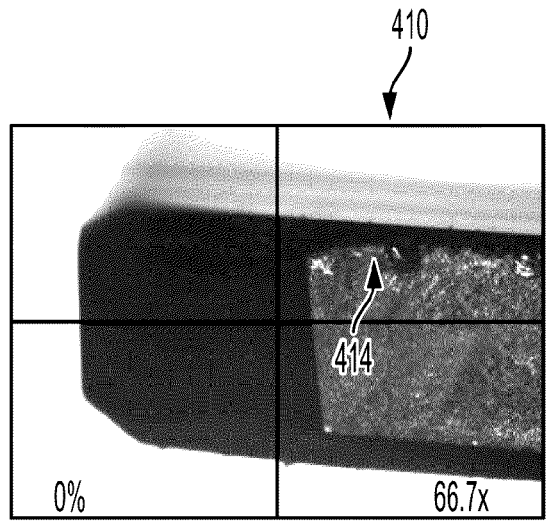
[Fig. 10C]
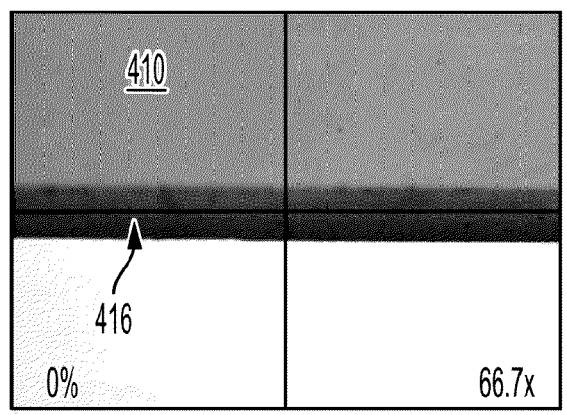
[Fig. 10D]
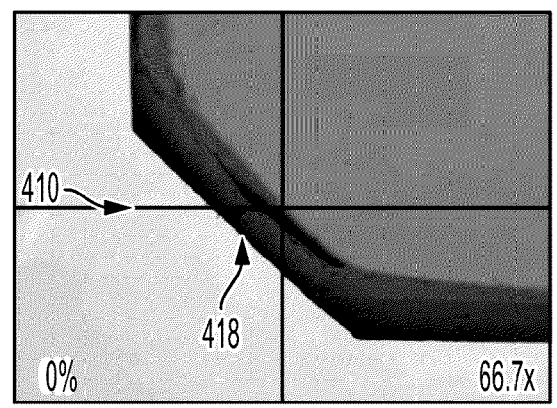

[Fig. 11]
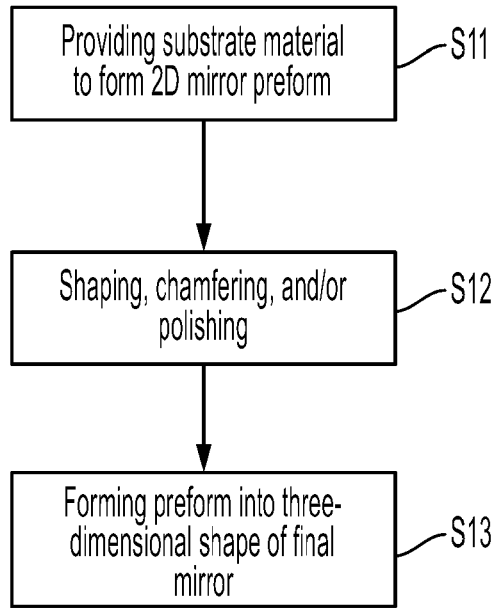
[Fig. 12A]
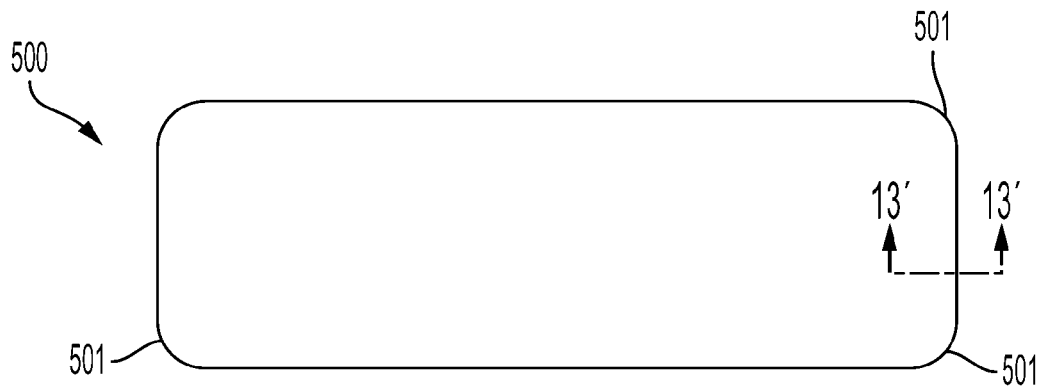
[Fig. 12B]

[Fig. 13]
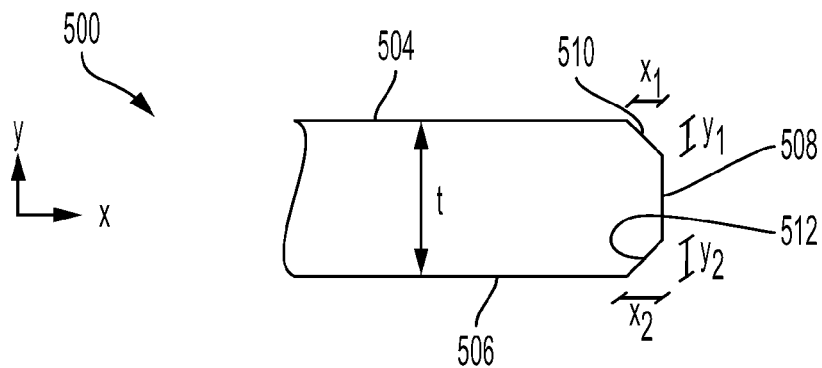
[Fig. 14]
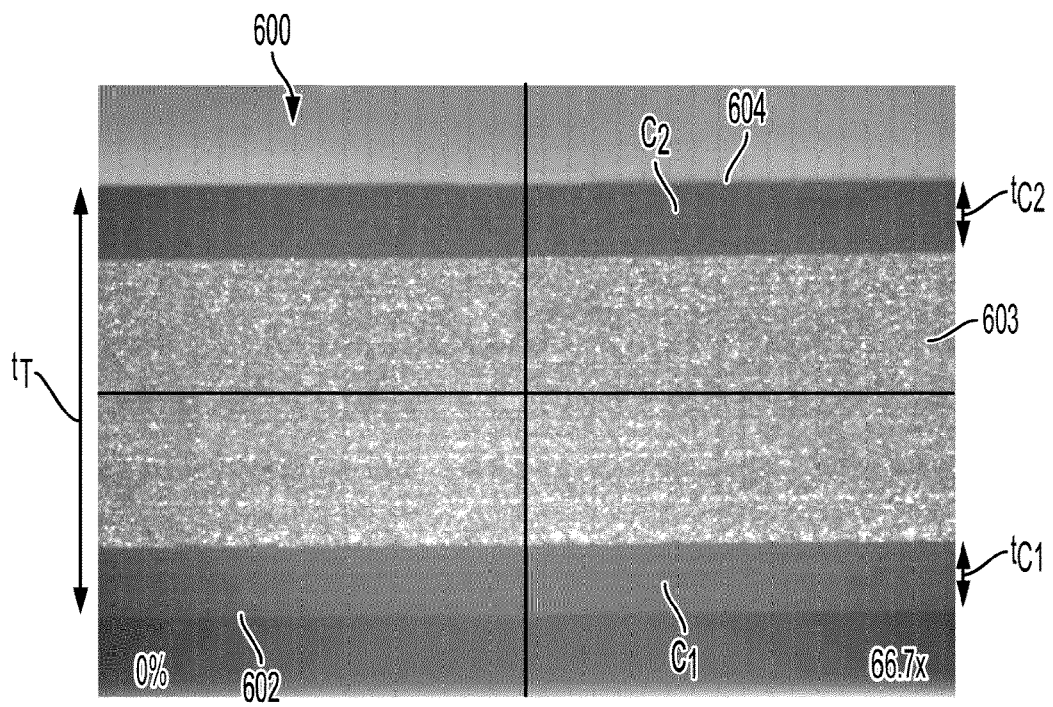
[Fig. 15A]
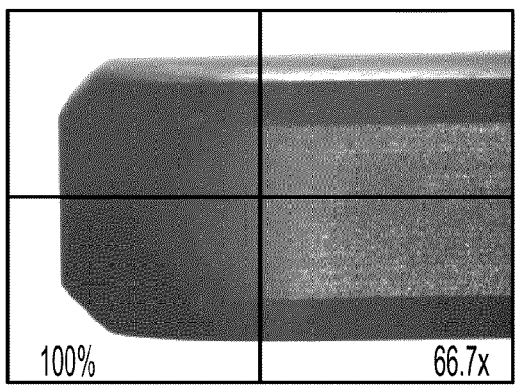

[Fig. 15B]
[Fig. 15C]
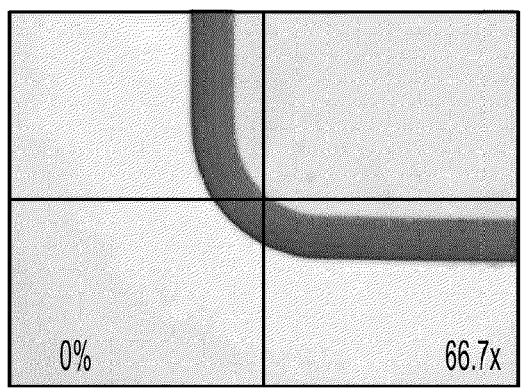

HEAD-UP DISPLAY MIRROR WITH IMPROVED SURFACE AND EDGE QUALITY AND METHODS FOR FORMING THE SAME

This application is a national stage application under 35 U.S.C. § 371 of International Application No. PCT/KR2019/016290, filed on Nov. 25, 2019, which claims the benefit of priority under 35 U.S.C. § 119 of U.S. Provisional Application Ser. No. 62/771,877 filed on Nov. 27, 2018 the content of which is relied upon and incorporated herein by reference in its entirety.

TECHNICAL FIELD

Background Art

Head-Up Display (HUD) systems project visual information onto a transparent surface so that users can see the information without diverting their gaze away from their primary view. HUD systems are being increasingly deployed in the transportation sector, including being used in automobiles, aircraft, marine craft, and other vehicles. For example, HUD systems are used in vehicles so that an operator or driver of the vehicle can see information relevant to the operation of the vehicle while maintaining a forward gaze and without having to look down or away towards a display screen. Thus, HUD systems are believed to improve safety by minimizing the need for a vehicle operator to look away from a safe operating viewpoint.

DISCLOSURE OF INVENTION

Technical Problem

However, HUD systems have often suffered from poor optical quality in the projected image, which may result in an undesirable aesthetic quality to the projected image. Poor optical quality may even decrease the safety of HUD systems, because blurry or unclear projected images can make it more difficult for users to read or understand the projected information, resulting in increased user processing time of the information, delayed user reaction time based on the information, and increased user distraction. HUD systems typically use a mirror to reflect and project an image onto the transparent surface and reduced optical quality can result from imperfections in the mirror used in the HUD system. For example, imperfections in the surface or shape accuracy of the mirror due to poor durability or manufacturing defects can reduce optical performance. These imperfections include inaccuracies in the shape of curvature of the mirror that occur during shaping and/or bending the mirror, or from surface and/or edge imperfections from cutting, shaping, and/or polishing the edge of the mirror or mirror substrate.

Thus, there remains a need for HUD systems, and particularly improved mirrors for HUD systems, that have improved optical quality.

Solution to Problem

In some embodiments of the present disclosure, a head-up display (HUD) mirror substrate is provided. The mirror substrate has a first major surface with a concave shape, a second major surface opposite to the first major surface and with a convex shape, and a minor surface connecting the first and second major surfaces. The mirror substrate includes a glass or glass-ceramic material, and the first major surface has a first surface roughness Ra of 3 nm or less and a peak to valley (PV) roughness of less than 30 nm. In aspects of some embodiments, the mirror substrate has an edge that is not cut, shaped, chamfered, or polished while the mirror substrate is in a curved state. The minor surface can have a cross-sectional edge profile that includes a chamfer, including a C-chamfer or an R-chamfer. The C-chamfer may have a length that is 0.1 mm or greater, or 0.3 mm or greater. The R-chamfer may have a length of 0.5 mm or greater. In an aspect of an embodiment, the mirror substrate, in a plan view, has rounded corners, and the rounded corners are not shaped or polished while the mirror substrate is in a curved state. According to some embodiments, the concave surface of the mirror substrate has an aspheric shape.

The HUD mirror substrate of embodiments herein can have a length from about 200 mm to about 400 mm and a width from about 100 mm to about 250 mm; a length from about 250 mm to about 350 mm and a width from about 100 mm to about 200 mm; a length from about 300 mm to about 350 mm and a width from about 150 mm to about 200 mm; or a length from about 290 mm to about 295 mm and a width from about 130 mm to about 135 mm. As an aspect of some embodiments, the mirror substrate has a contour peak to valley (PV) shape accuracy of less than 100 µm, or less than 50 µm on the concave surface, an arithmetic mean waviness Wa of less than 1 µm per 10 mm on the concave surface, and the convex surface has a surface roughness Ra of less than 30 nm, and a peak to valley (PV) roughness of less than 1 µm, or a surface roughness Ra of less than 20 nm, and a peak to valley (PV) roughness of less than 300 nm. As an aspect of some embodiments, the mirror substrate has a thickness defined as a distance between the first and second major surfaces, and the thickness is less than or equal to about 3.0 mm, is from about 0.5 mm to about 3.0 mm, is from about 0.5 mm to about 1.0 mm, or is from about 1.0 mm to about 3.0 mm. The glass or glass-ceramic material may include soda-lime glass, aluminosilicate, boroaluminosilicate or alkali aluminosilicate glass, and may be a strengthened or chemically strengthened glass material.

In some embodiments of the present disclosure, a three-dimensional HUD mirror is provided. The HUD mirror includes the HUD mirror substrate of the embodiments disclosed herein, and a reflective layer disposed on the first major surface of the mirror substrate.

In other embodiments of the present disclosure, a method of forming a three-dimensional mirror is provided. The method includes providing a mirror preform having a first major surface, a second major surface opposite to the first major surface, and a minor surface connecting the first and second major surfaces. The mirror preform is a glass or glass-ceramic material, and the first and second major surfaces are two-dimensional. The method further includes disposing the mirror preform on a molding apparatus having a curved support surface such that the second major surface is facing the curved support surface, and conforming the mirror preform to the curved support surface to form a curved mirror substrate having a convex surface corresponding to the second major surface and a concave surface corresponding to the first major surface, the concave surface having a first radius of curvature. After the step of conforming, the concave surface has a roughness Ra of less than 3 nm and a peak to valley (PV) roughness of less than 30 nm. As an aspect of some embodiments, the curved mirror substrate has an edge that is not cut, shaped, chamfered, or polished during or after the step of conforming. In particular, the minor surface has a cross-sectional edge profile that is identical to a cross-sectional edge profile of the curved mirror substrate, according to some embodiments.

In aspects of some embodiments, the method further includes processing the minor surface of the two-dimensional mirror preform to achieve a predetermined edge profile of the curved mirror substrate, where the processing includes at least one of cutting, chamfering, or polishing.

In some embodiments of the present disclosure, a method of forming a three-dimensional mirror is provided. The method includes forming a three-dimensional mirror substrate according to the methods disclosed herein, and disposing a reflective layer on the first major surface of the substrate.

Additional features and advantages of the claimed subject matter will be set forth in the detailed description that follows, and in part will be apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF DRAWINGS

For the purposes of illustration, there are forms shown in the drawings that are presently preferred, it being understood, however, that the embodiments disclosed and discussed herein are not limited to the precise arrangements and instrumentalities shown.

FIG. 1 is a schematic illustration of HUD system in a vehicle according to some embodiments of the present disclosure.

FIG. 2 is a pictorial depiction of an automobile driver's viewpoint when using the HUD system of FIG. 1, according to some embodiments.

FIG. 3 is an illustration of an automobile driver's viewpoint when using a HUD system with a combiner, according to some embodiments.

FIG. 4 is an illustration of an aspheric mirror for a HUD system according to some embodiments.

FIG. 5 shows steps of a conventional method of forming a HUD mirror or mirror substrate.

FIG. 6 is a plan view of a sheet material from which a HUD mirror substrate is cut.

FIG. 7 is a cross section of a cut HUD mirror substrate having a edge profile with chamfered corners.

FIG. 8 is a photograph of an edge of a mirror substrate formed according to a conventional method.

FIGS. 9A and 9B are magnified views of the convex and concave surfaces, respectively, of the mirror substrate of FIG. 8.

FIGS. 10A-10D are microscopy images of rough edges of a mirror substrate formed according to a conventional method.

FIG. 11 shows steps of a method of forming a HUD mirror or mirror substrate according to embodiments of this disclosure.

FIGS. 12A and 12B are plan views of HUD mirror preforms according to embodiments of this disclosure.

FIG. 13 is a cross-section view of an edge of the mirror preform in FIG. 12B at line 13'-13'.

FIG. 14 is a microscopy image of an edge of a HUD mirror substrate formed according to methods of embodiments of this disclosure.

FIGS. 15A-15C are microscopy images of edges of a HUD mirror substrate formed according to methods of this disclosure.

BEST MODE FOR CARRYING OUT THE INVENTION

Figure 16:
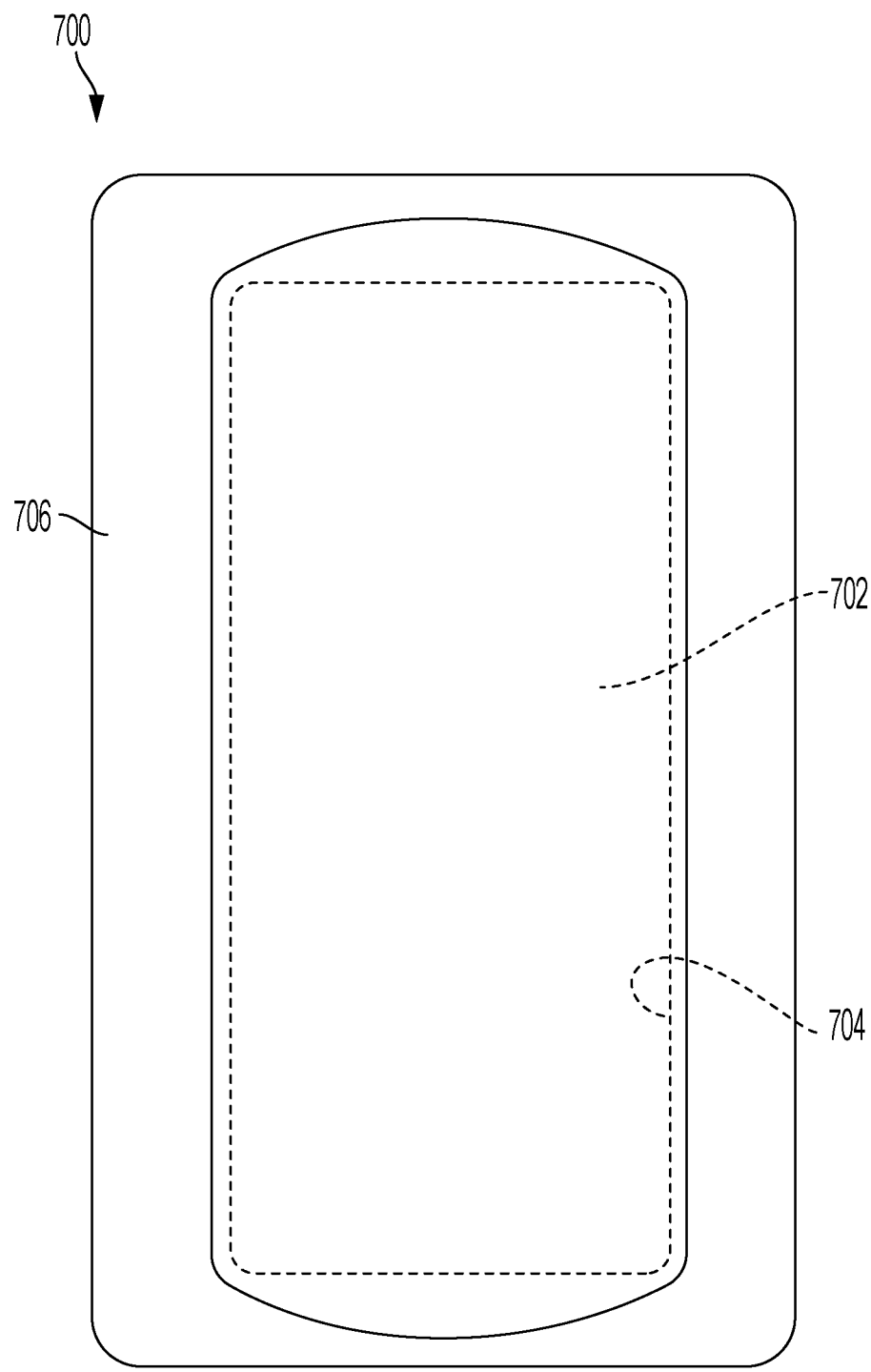
FIG. 16 is a plan view of a vacuum-based forming surface for forming two-dimensional substrates into three-dimensional substrates according to some embodiments of the present disclosure.

HUD systems can be used to provide a variety of information for improved safety and convenience of HUD users. In transportation, for example, information relevant to vehicle operation, such as vehicle gauges or navigation, can be projected to an area in front of a driver. This can include real-time information on vehicle speed, fuel level, climate control settings, entertainment settings, turn-by-turn navigation indicators, estimated time of arrival, and alerts related to speed, traffic, or dangerous conditions. Information can be presented as text, symbols, pictures, videos, animation, and in one or more colors. It is also desired to have HUD systems with augmented reality (AR) functions that present information relevant to the current exterior environment of the vehicle, and such information can be, from the user's perspective, overlaying or otherwise interacting with those relevant exterior environmental elements. For example, AR HUD imagery may highlight points of interests as a user approaches them. Because AR HUDs may display information that overlays or interacts with what is seen by the user, a larger projected image is beneficial. However, larger images can be more difficult to produce due to difficulties in producing mirrors or optical components of suitable quality at the sizes necessary to project large AR HUD images. It is believed that these HUD systems will increase in frequency of use and application as vehicles become more connected and intelligent. Thus, the above are examples only of HUD system usage, and embodiments of this disclosure are not intended to be limited to these examples.

As shown in FIG. 1, a HUD system 100 may be provided in a vehicle V, which may be an automobile, for example, that is operated by a driver D. The HUD system 100 may be built into the vehicle itself, with all or some portion incorporated into the dash 110 of the vehicle V, as shown in FIG. 1, for example. The HUD system 100 includes a picture generating unit (PGU) 102 connected to a display 103 configured to produce an image based on a signal from the PGU 102. That image is then directed in one way or another from the display 103 to an area viewable by the user, such as an area of the windshield 108 or some other surface. In FIG. 1, the image is reflected by a flat mirror 104 to a curved mirror 106. From the curved mirror 106, the image is projected toward the windshield 108 and onto a projection area 112 of the windshield 108. The HUD system 100 can be configured so that the projection area 112 is within the normal line of sight of the driver D while driving the vehicle V or to a predetermined area suitable for viewing while operating the vehicle V. For example, the projection area 112 can be positioned so that the projected image is overlaid on the road as seen from the driver's perspective. An example of this scenario is shown in the illustration of FIG. 2, where the dotted line defines an invisible projection area 112 within which the image is projected onto the windshield 108.

The display can include a cathode ray tube (CRT) display, a light-emitting diode (LED) display, a liquid crystal display (LCD) assembly, laser projection system, a waveguide display, or other type of display known by those of ordinary skill in the art. The PGU may include a computer or processor for generating or processing the images produced by the display. The optical components may include some combination of lenses, beam splitters, mirrors, and combiner, for example, and the components and HUD system design are not limited to the example shown in FIG. 1. The combination of components of a HUD system can be configured to produce collimated light. The collimated light is projected onto a surface or combiner that is in a field of view of a user so that the user can see the projected image and the normal field of view simultaneously. For example, in vehicular applications, the combiner can be a windshield. Alternatively, the combiner can be a separate component that is built into the vehicle, or a portable component that can be mounted in the vehicle in a location where a driver or passenger can see the projected image on a transparent surface of the combiner.

While the projection area 112 is located on the windshield 108 in FIGS. 1 and 2, FIG. 3 shows an alternative embodiment in which a combiner 208 that is used for the projection area 212 is separate from the windshield and is positioned between the windshield and the driver. The combiner 208 can be built into the dash 210 of a vehicle or can be a portable or separable component that is positioned on top of the dash 210. Embodiments of this disclosure are not limited to any one or more HUD system or particular arrangements of the optical components of a HUD system, as persons of ordinary skill in the art will understand the basic arrangement of components in a HUD system. The present disclosure is directed primarily to the curved or three-dimensional mirrors used in HUD systems or the mirror substrates used to form the three-dimensional HUD mirrors and methods of forming and shaping the same. The three-dimensional (3D) mirrors in HUD systems, such as curved mirror 106 in FIG. 1, consist of some type of mirror substrate made, which has conventionally been made of a plastic material. Embodiments of this disclosure are primarily directed to mirror substrates made of glass or glass-ceramic materials, though aspects of some embodiments are relevant to mirror substrates of various other materials. The 3D mirror may have a reflective coating on a concave surface of a substrate. The curved substrate may be spherical, aspherical, a Fresnel shape, and/or diffractive. In one preferred embodiment, the reflective surface or coating is provided on a concave, aspherical surface. An aspheric surface has multiple radii of curvature. For example, in the case of a four-sided aspheric mirror, the aspheric surface may have a different radius of curvature along each of the four edges. Thus, as shown in FIG. 4, a mirror 300 has a reflective surface 308 that is aspherically shaped with a radius of curvature $R_1$ along a first edge, a radius of curvature $R_2$ along a second edge, a radius of curvature $R_3$ along a third edge, and a radius of curvature $R_4$ along a fourth edge. Because the surface 308 is aspherically shaped, $R_1 \neq R_2 \neq R_3 \neq R_4$. FIG. 4 also shows how different points on the curved surface 308 have been displaced by varying amounts a-e with respect to a two-dimensional plane connecting the four corners of the mirror 300. This plane may be a reference plane representing a two-dimensional mirror substrate before being formed into the three-dimensional shape shown. In some embodiments, a HUD mirror is provided where $a \neq b \neq c \neq d$.

However, the curved mirrors used in HUD systems and the methods of forming those mirrors can be improved in terms of the resulting shape accuracy and the surface and edge quality of the mirrors. For example, to prevent degradation of image quality as the image is reflected by the curved mirror, the mirror should have a high level of shape accuracy and surface roughness. In embodiments of this disclosure, a shape precision of less than 50 μm and a surface roughness (Ra) of less than 3 nm are achieved. A particular type of optical distortion that occurs in mirrors for HUD systems is referred to as edge distortion, which is optical distortion of light reflected at or near the edge of the mirror. In existing HUD systems, optically impactful imperfections may be introduced into the mirror during manufacturing or shaping of the mirror. This includes the most common methods for forming 3D-shaped mirrors or mirror substrates, which can be divided into two categories: press-forming methods and vacuum-forming methods. Both pressing and vacuum-forming methods, however, can have disadvantages.

In a press-forming method, upper and lower molds are used to press the substrate, such as a glass substrate, by physical force. For example, the upper mold may be pressed into a lower mold with a 2D glass preform disposed between the two molds, and the glass preform is formed according to the shape of a surface on one or both of the molds. As a result, mold imprints may be left on both the concave and convex surfaces of the formed glass substrate, which then requires polishing. In addition, due to deviations in the contours of the upper and lower molds, it can be difficult to precisely match the contours of the upper and lower molds, and thus difficult to achieve a precise shape for the formed glass substrate. For example, the specification for aspheric mirror contours can be less than ±25 μm, while the mold contour deviation after machining is normally 30-50 μm.

In a vacuum-forming method, a single mold (e.g., lower mold) can be used, where vacuum holes are formed in the surface of the mold. A flat or two-dimensional (2D) glass sheet is disposed on the surface of the mold and vacuum pressure is supplied via the vacuum holes to conform the glass to the curved or three-dimensional (3D) surface of the mold. The vacuum surface is often formed from a ceramic material with holes throughout the forming surface. However, it is difficult to avoid the formation of vacuum hole marks on the surface of the formed glass substrate. These vacuum hole marks or manufacturing artifacts can impair the optical performance of the substrate or the finished mirror. In addition, typical vacuum forming methods can require higher forming temperatures compared to pressing methods. Higher forming temperatures can affect surface quality and form defects such as dimples, pits, and imprints.

With reference to FIGS. 5 and 6, conventional methods use an oversized two-dimensional substrate 350 provided in step S1 in a 3D forming process (either a press-forming or vacuum-forming curving process). As used herein, "oversized" means that the length and/or width of the 2D substrate material is greater than required for the dimensions of the finished 3D HUD mirror. As discussed below, the use of an oversized substrate means that the oversized substrate will have to be subsequently cut to a smaller size to form the finished 3D mirror. In step S2, the oversized 2D substrate 350 is formed into a three-dimensional shape. The resulting oversized and curved substrate material is then cut along a defined path 352 in step S3, resulting in a 3D mirror substrate 354 of the desired size, and the outer waste glass 356 can be discarded. In addition, after cutting, additional surface and edge treatments, including shaping, chamfering and/or polishing, may be performed in step S4. Post-cutting edge treatments may be necessary to repair or minimize defects created by the cutting itself, or to shape the cut edge to a desired profile shape. FIG. 7 shows an example of typical chamfering at the edge of a 3D HUD mirror 360, which has a chamfer 362 on the first major surface 363 and a chamfer 364 on the second major surface 364 of the 3D HUD mirror 360.

However, the cutting of the oversized substrate to the 3D mirror size is very difficult due to the oversized substrate already being formed into a 3D shape when cutting occurs. Thus, it may be difficult to cut to the exact shape and dimensions desired for the finished product because of the difficult in cutting the 3D surface. This results in a relatively large variation in product dimensions of the finished products. In addition, due to the 3D shape of the aspheric mirror, the edges cannot be easily polished or chamfered using a standard wheel polishing method, and instead must rely on complicated, slow, and expensive computer numerical control (CNC) chamfering. It is also difficult to maintain a constant chamfer quality due the chamfering being performed along the 3D curved edge. Finishing of the corners of the mirror is difficult for the same reason. For example, it may be desirable to shape the corners 358 of the 3D mirror (when viewed in a plan view) into a rounded corner shape for aesthetic purposes or improved durability and handling. However, due to the difficulty in finishing the corners of the 3D substrate, a straight-cut corner or chamfer is usually applied instead.

FIG. 8 is a micrograph of a glass sheet 400 from a side view. The glass sheet 400 has been formed into a 3D shape having a convex side 402, a concave side 404, and an edge surface 406. The glass sheet has a thickness $t_1$ of 1.71 mm and, after edge polishing, the convex side and the concave side both have chamfers $C_x$ and $C_y$, respectively, as shown in FIGS. 9A and 9B. The chamfers $C_x$ and $C_y$ are formed by a rough edge grinding. In this example, chamfers $C_x$ and $C_y$ have thickness of $t_2$ and $t_3$, which, in the sample shown, are both 0.06 mm. Due to the rough edge grinding being performed on the 3D formed substrate, the quality of the chamfering is visibly rough and inconsistent, and results in chipping of the glass at the edge. Also, it is very difficult to achieve a C chamfer of 0.1 mm or more according to the conventional method. The defects can impair performance and reduce the structural integrity of the glass sheet 400.

The rough quality of the edge of this conventional forming method can be seen more clearly in the micrograph images of FIGS. 10A-10D. In particular, FIG. 10A shows a side view of a glass sheet 410 with a coarse edge 412 due to cutting from the oversized 3D sheet. FIG. 10B shows another portion of the edge of the glass sheet, with visible chips 414 in the edge. In FIG. 10C, a plan view of a surface of the glass sheet near the edge shows unevenness in the edge quality as evidences by variations in dark and light regions of the edge 416. As shown in FIG. 10D, the corner of the glass sheet 410 is cut with a linear corner cut 418 due to the difficulty in producing a controlled rounded corner on the 3D glass substrate.

However, according to embodiments of this disclosure, chamfering, polishing, and/or edge shaping are done to a 2D mirror preform. As used herein, "preform" refers to a substantially two-dimensional mirror substrate before 3D forming (e.g., vacuum forming), and the preform is pre-cut or shaped to a size that will result in the desired size for the 3D mirror after 3D forming. Thus, the edge of the preform can be easily and efficiently chamfered, polished, or shaped while the preform is in a 2D state. After these edge finishing steps, vacuum forming can be performed on the mirror preform. As a result, no edge finishing (chamfering, polishing, or shaping) is required once the mirror substrate is in a 3D state. In addition, the length and width of the 2D preform may be sized to account for some shrinkage of the substrate as it is formed into a 3D substrate.

Thus, forming using over-sized glass substrates requires the added steps of cutting the glass after forming; has low glass utilization due to trim glass or waste glass after forming; requires edge polishing and/or chamfering after cutting that is difficult and relatively ineffective; and requires larger equipment even though the eventual finished product may be the same size as that formed in preform-based forming. On the other hand, in 3D forming using a mirror preform of embodiments of the present disclosure, there is no need to cut the mirror substrate after vacuum forming, which reduces the production of waste or cullet glass. In addition, preform-based forming can be a simpler process, more cost effective, and produces a 3D mirror of superior quality, particularly in terms of surface edge quality, roughness, and dimensional stability.

FIG. 11 depicts steps in the above-described method according to one or more embodiments of this disclosure. In step S11, a substrate material (e.g., a glass sheet) is provided. The 2D substrate material is cut or sized to approximately the size of the finished 3D mirror, accounting for slight shrinking in the lateral dimensions of the preform from 3D forming, to form the 2D mirror preform. In step S12, any surface or edge treatments such as edge shaping, chamfering, and/or polishing is carried out on the 2D mirror preform prior to forming (e.g., vacuum forming) in a 3D mirror substrate. In step S13, after the surface and/or edge treatments are finished, the 2D mirror preform is formed into the 3D mirror substrate. After step S13, no additional edge treatments, such as edge shaping, chamfering, cornering, or polishing, is conducted. The reflective coating may be deposited on the concave surface before or after 3D forming.

As discussed above, by using a 2D preform to create the 3D mirror substrate, the dimensions of the resulting 3D mirror are attained with very high accuracy and low variation. In one or more embodiments, a dimension tolerance of ±0.1 mm is possible, regardless of the curvature complexity or product size of the 3D mirror. For example, large mirror substrates were produced with a variation of less than 0.05 mm for both the length and width dimensions, where the length of the substrates was approximately 291 mm and the width was approximately 130.5 mm. In one or more embodiments, the shape accuracy, measured in terms of contour PV or contour deviation, is less than or equal to 50 μm for a HUD mirror substrate having a horizontal dimension of less than about 250 mm, and less than or equal to about 100 μm for a HUD mirror substrate having a horizontal dimension of less than about 350 mm. Thus, the dimensional consistency is possible with even large HUD mirrors while maintaining the edge quality of the 2D preform. For example, embodiments of this disclosure include HUD mirror substrates with a length of about 200 mm or more, about 250 mm or more, about 300 mm or more, or about 350 mm or more. The width of the HUD mirror substrates may be about 100 mm or more, about 150 mm or more, or about 200 mm or more. In some particular embodiments, the HUD mirror substrate can have a length of about 350 mm or more and a width of about 200 mm or more.

FIGS. 12A and 12B show plan views of 2D mirror preforms according to some embodiments of this disclosure. As shown in FIG. 12A, the mirror preform 500 has rounded corners 501, which are more easily achieved on a 2D preform than on a 3D mirror substrate, as discussed above. FIG. 12B shows a similar mirror preform 502, but with a pair of opposite edges 503 that are rounded rather than straight. These rounded edges 503 can be advantageous in a method of vacuum-forming the 2D mirror preform where the rounded edges 503 correspond to a curvature of the vacuum mold so that vacuum pressure does not leak between the rounded edges 503 and the vacuum mold surface.

FIG. 13 is a partial cross-section view of the mirror preform 500 taken at line 13'-13' in FIG. 12A. As shown in FIG. 13, the HUD mirror preform 500 has a first major surface 504 that is the mirror-side of the preform, a second major surface 506 opposite the first major surface 504, and a minor surface 508 between the first and second major surfaces 504 and 506. A thickness t of the mirror preform 500 is defined as a distance between the first and second major surfaces 504 and 506. The edges of the first and second major surfaces 504 and 506 have a first chamfer 510 and a second chamfer 512, respectively. According to various embodiments of this disclosure, the first and second chamfers 510 and 512 can symmetrical, meaning they have equal lengths, or they can be asymmetrical where one chamfer is longer than the other.

The geometry of the first and second chamfers 510 and 512 can be described by the x- and y-components of the chamfered surface. As used herein, the x-component refers to a distance measured in a direction parallel to the first or second major surface of a two-dimensional preform. The y-component refers to a distance measured in a direction perpendicular to the first or second major surface of the two-dimensional preform, or parallel to the minor surface of the two-dimensional preform. For example, the first chamfer 510 may have an x-component $x_1$ and a y-component $y_1$, while the second chamfer 512 may have an x-component $x_2$ and a y-component $y_2$. The dimensions of $x_1$, $y_1$, $x_2$, and $y_2$ can range from about 0.2 to about 0.3 mm, for example, where $x_1$ is the same as $x_2$ and $y_1$ is the same as $y_2$, which would result in symmetrical chamfering. However, the chamfers can be asymmetric, as well. For example, one of the chamfers 510 and 512 may be a larger chamfer having a larger x- or y-component.

According to some embodiments, asymmetric chamfering of the substrate edge can result in improved formability and alleviates the visibility of distorted images reflected by the edge of the mirror. In the case of edge distortion, the angle of reflection of the display image changes due to the inclination of the chamfered surface, which can prevent the distorted image from being seen by the user. This can result in a projected image with no perceived edge distortion. Edge formability is thought to be improved by thinning of the edge area due to the large chamfer, which makes the edge area more formable. For example, when using identical vacuum pressure, the edge contour deviation relative to the computer-aided design (CAD) model decreases and the contour accuracy increases for an asymmetric edge as compared to a non-asymmetric edge. This improvement in contour accuracy reduces image distortion. In addition, the asymmetric chamfering can help prevent unwanted or dangerous light from entering the glass edge and being directed toward the eyes of a user of the HUD system. Such unwanted light may include sunlight, for example, which can distract drivers or interfere with their vision. However, symmetric chamfers may be preferred in some embodiments.

FIG. 14 shows a microscopy image of a side view of a 3D mirror substrate 600 according to an embodiment of this disclosure. The 3D mirror substrate 600 has a first primary surface 602 having a concave surface and a C chamfer $C_1$ at the edge of the surface, a second primary surface 604 having a convex surface and a C chamfer $C_2$ at the edge of the surface, and a minor surface 603 separating the first and second primary surfaces 602 and 604. In FIG. 14, edge shaping, profiling, and chamfering was performed on a 2D mirror preform prior to 3D forming, which resulted in an edge quality that is more consistent and relatively free of defects as compared to that of FIG. 10A. The sample in FIG. 14 was made from a glass sheet having a thickness $t_T$ of 2.0 mm and has symmetrical C chamfers of thickness $t_{C1}$ and $t_{C2}$, each of 0.424 mm. Thus, much larger C chamfers are possible using the mirror preform method of the present disclosure. Because edge polishing was performed on the 2D preform, a very fine polish was achievable on the concave- and convex-side chamfers $C_1$ and $C_2$, and the minor surface 603 of the edge was also finely polished.

FIG. 15A shows a side view of the 3D mirror substrate 600 of FIG. 14 near one of the four corners of the 3D mirror substrate 600 and, compared to FIG. 10B, shows little to no chipping at the edge. In FIG. 15B, the consistency of the edge is higher than that shown in FIG. 10C as evidenced by the even gray shade at the edge. FIG. 15C shows that a rounded corner shape can be easily achieved. The rounded corner was formed on the 2D preform, which is easier to form a rounded corner on and the straight corner of FIG. 10D can be avoided.

As seen by comparing FIGS. 14-15C with the above examples using conventional methods based on cutting an oversized 3D substrate, the mirror substrates and methods of the present disclosure result in an edge quality that is not possible with the conventional methods. Thus, it is possible to achieve a 3D mirror substrate or HUD mirror with a very fine surface roughness and edge profile due to achieving the finest roughness and precise edge shaping that are possible through fine grinding, shaping, and polishing of a 2D preform.

As discussed above, embodiments of this disclosure include forming a curved or 3D mirror substrate using vacuum forming methods. In one aspect, the vacuum forming method uses a mold 700, as shown in FIG. 16. Mold 700 has a forming surface 702 that is shaped to a desired shape of the 3D mirror or mirror substrate. The mold 700 can optionally include a housing 706 surrounding the perimeter of the forming surface 702 and at least partially surrounding and defining a space in which the mirror preform is placed for forming. To conform the mirror substrate (not shown) to the forming surface 702, vacuum pressure is supplied through one or more vacuum holes. However, as discussed above, vacuum holes can leave manufacturing artifacts in the form of imperfections where the substrate contracted the vacuum holes. Thus, mold 700 does not include vacuum holes in an area that will contact the effective area of the mirror substrate. Instead, the mold 700 has a ditch-type vacuum hole 704 at a periphery of the forming surface 702. Due to the position of the ditch-type vacuum hole 704 relative to the larger chamfer, any imperfection or artifact resulting from the ditch-type vacuum hole 704 will not be apparent to a user of a HUD system because the imperfection will not be located in the effective area of the mirror. According to some embodiments, the ditch-type vacuum hole 704 will be positioned at about 2.0 mm or less inside the edge of the 2D mirror preform, when the preform is placed on the forming surface 702. As used herein, the effective area is a portion of the mirror or mirror substrate that will reflect the image to be projected and viewed by the user, and is located within the chamfered edge area of the mirror or mirror substrate.

At least a portion of the first major surface of the 3D HUD mirror is a reflective surface. The reflective surface includes a coating or other layer applied to the first major surface, and can include one or more metal oxide, ceramic oxide, or metal-ceramic alloy, for example. In particular embodiments, the reflective coating is made of aluminum or silver. The reflective surface can be formed via sputtering, evaporation (e.g., CVD, PVD), plating, or other methods of coating or supplying a reflective surface known to those of ordinary skill in the art. The reflective surface is created on the 3D formed substrate after forming the substrate to a curved or aspheric shape. However, embodiments are not limited to this order, and it is contemplated that a 3D mirror can be formed from a 2D preform having a reflective surface. In particular, the vacuum-based 3D forming methods disclosed herein allow creation of a 3D mirror from a 2D mirror preform with a reflective surface without degrading the reflective surface on the first major surface. In addition, embodiments of this disclose also allow for low-temperature 3D forming, which can help preserve the reflective surface during curving of the glass preform.

According to one or more embodiments of this disclosure, a head-up display (HUD) mirror substrate is provided that has a first major surface with a concave shape, a second major surface opposite to the first major surface and with a convex shape, and a minor surface connecting the first and second major surfaces. The mirror substrate comprises a glass or glass-ceramic material, and the first major surface exhibits a first surface roughness Ra of 3 nm or less and a peak to valley (PV) roughness of less than 30 nm. As described above, the HUD mirror substrate has an edge that is not cut, shaped, chamfered, or polished while the mirror substrate is in a curved state. Specifically, any cutting, shaping, chamfering, or polishing is applied to a 2D mirror preform before the preform is formed in the 3D shape of the HUD mirror substrate, and no further cutting, shaping, chamfering, or polishing of the edge is performed after 3D-forming of the HUD mirror substrate.

As an aspect of one or more embodiments, the minor surface has a cross-sectional edge profile comprising a chamfer, which can be shaped as a C chamfer or an R chamfer, for example. However, the cross-sectional edge profile can be shaped in other ways not discussed herein, because the ease of shaping and polishing the 2D mirror preform allows for various finishing steps to be performed with ease. In the case of a C chamfer, the length of the chamfer can be 0.1 mm or greater, or 0.3 mm or greater. In the case of an R chamfer, the length of the chamfer can be 0.5 mm or greater. In addition, the mirror substrate may have rounded corners. Specifically, when the mirror substrate is viewed in a plan view, the corners of the first and/or second major surface are rounded. In addition, the rounded corners of the mirror substrate are not shaped or polished while the mirror substrate is in a curved or 3D state.

The concave surface of the HUD mirror substrate has an aspheric shape, in one or more particular embodiments. No matter the particular shape or complexity of the curvature, the convex surface and the concave surfaces can have symmetrical chamfers. In addition, the mirror substrate can be a large enough for a so-called AR HUD application. For example, the mirror substrate can have a length from about 200 mm to about 400 mm and a width from about 100 mm to about 250 mm; a length from about 250 mm to about 350 mm and a width from about 100 mm to about 200 mm; a length from about 300 mm to about 350 mm and a width from about 150 mm to about 200 mm; or a length from about 290 mm to about 295 mm and a width from about 130 mm to about 135 mm.

Despite the large sizes achievable, the shape accuracy and surface and/or edge quality or roughness can be maintained at desired levels. As an aspect of one or more embodiments, the mirror substrate has a contour peak to valley (PV) shape accuracy of less than 100 µm, or less than 50 µm on the concave surface. The mirror substrate has an arithmetic mean waviness Wa of less than 1 µm per 10 mm on the concave surface. As a further aspect of embodiments, the convex surface has a surface roughness Ra of less than 30 nm, and a peak to valley (PV) roughness of less than 1 µm. The convex surface may have a surface roughness Ra of less than 20 nm, and a peak to valley (PV) roughness of less than 300 nm. The convex surface may further include a ditch-type vacuum hole imprint within 2 mm from the edge of the convex surface. The ditch-type vacuum hole imprint can have a depth of less than 1 µm, according to some embodiments. In addition, the convex surface does not have any other vacuum hole imprint other than the ditch-type vacuum hole imprint. As a further aspect of one or more embodiments, the concave surface has a roughness Ra of less than 2 nm or less than 1 nm, and a peak to valley (PV) roughness of less than 20 nm, less than 15 nm, or less than 12 nm.

In one or more embodiments, the mirror substrate has a thickness defined as a distance between the first and second major surfaces, and the thickness is less than or equal to about 3.0 mm, is from about 0.5 mm to about 3.0 mm, is from about 0.5 mm to about 1.0 mm, or is from about 1.0 mm to about 3.0 mm. The glass or glass-ceramic material used for the mirror substrate may include soda-lime glass, aluminosilicate, boroaluminosilicate or alkali aluminosilicate glass. In addition, the glass or glass-ceramic material can be a strengthened glass material, such as chemically strengthened.

According to one or more embodiments, a three-dimensional HUD mirror is provided that includes the HUD mirror substrate described above, and a reflective layer disposed on the first major surface of the mirror substrate.

In further embodiments, a method of forming a three-dimensional mirror is provided. The method includes providing a mirror preform having a first major surface, a second major surface opposite to the first major surface, and a minor surface connecting the first and second major surfaces. The mirror preform includes a glass or glass-ceramic material, and the first and second major surfaces of the preform are two-dimensional. The method further includes disposing the mirror preform on a molding apparatus having a curved support surface such that the second major surface is facing the curved support surface, and conforming the mirror preform to the curved support surface to form a curved mirror substrate having a convex surface corresponding to the second major surface and a concave surface corresponding to the first major surface, where the concave surface includes a first radius of curvature. After the step of conforming, the concave surface has a roughness Ra of less than 3 nm and a peak to valley (PV) roughness of less than 30 nm.

As an aspect of one or more embodiments of the above method, the curved mirror substrate has an edge that is not cut, shaped, chamfered, or polished during or after the step of conforming. The minor surface has a cross-sectional edge profile that is identical to a cross-sectional edge profile of the curved mirror substrate. An edge profile of the mirror preform can include a chamfer on at least one of a first major surface-side of the minor edge and a second major surface-side of the minor edge, and the chamfer can be a C chamfer or an R chamfer. In the case of a C chamfer, the length of the C chamfer is 0.1 mm or greater, or 0.3 mm or greater. In the case of an R chamfer, the length of the R chamfer is 0.5 mm or greater.

In a further aspect of some embodiments, the surface roughness of the minor surface after the step of conforming is within 2% of the surface roughness of the minor surface prior to the step of conforming. The surface roughness of the minor surface after the step of conforming may be identical to the surface roughness of the minor surface prior to the step of conforming. The mirror preform, when viewed in a plan view, has rounded corners. The rounded corners may be identical to the rounded corners of the mirror preform, and are not shaped or polished during or after the step of conforming. In one or more embodiments, the method includes processing the minor surface of the two-dimensional mirror preform to achieve a predetermined edge profile of the curved mirror substrate, the processing including at least one of cutting, chamfering, or polishing.

As an aspect of some embodiments, the curved mirror substrate has a length from about 200 mm to about 400 mm and a width from about 100 mm to about 250 mm; a length from about 250 mm to about 350 mm and a width from about 100 mm to about 200 mm; a length from about 300 mm to about 350 mm and a width from about 150 mm to about 200 mm; or a length from about 290 mm to about 295 mm and a width from about 130 mm to about 135 mm. the curved mirror substrate has a contour peak to valley (PV) shape accuracy of less than 100 µm, or less than 50 µm on the concave surface. The curved mirror substrate can further have an arithmetic mean waviness Wa of less than 1 µm per 10 mm on the concave surface. In addition, the curved mirror substrate may have a maximum roughness depth $R_{max}$ of less than 30 nm on the concave surface. THe convex surface has a surface roughness Ra of less than 30 nm, and a peak to valley (PV) roughness of less than 1 µm, or a surface roughness Ra of less than 20 nm, and a peak to valley (PV) roughness of less than 300 nm.

In an aspect of some embodiments, the curved support surface comprises a ditch-type vacuum hole. In particular, when the mirror preform is disposed on the molding apparatus, the ditch-type vacuum hole is within 2 mm of an edge of the second major surface. After the step of conforming, the convex surface has a ditch-type vacuum hole imprint within 2 mm from the edge of the convex surface along an entirety of the edge. The ditch-type vacuum hole imprint may have a depth of less than 1 µm. The convex surface does not have any other vacuum hole imprint other than the ditch-type vacuum hole imprint. As a further aspect of one or more embodiments, the concave surface has a roughness Ra of less than 2 nm or less than 1 nm, and a peak to valley (PV) roughness of less than 20 nm, less than 15 nm, or less than 12 nm. In one or more embodiments, the mirror preform has a thickness defined as a distance between the first and second major surfaces, wherein the thickness is less than or equal to about 3.0 mm, is from about 0.5 mm to about 3.0 mm, is from about 0.5 mm to about 1.0 mm, or is from about 1.0 mm to about 3.0 mm.

As a further aspect of one or more embodiments of the method, the step of conforming is performed at a temperature that is less than a glass transition temperature of the mirror preform. A temperature of the mirror preform or the curved mirror substrate is not raised above the glass transition temperature of the mirror preform during or after the step of conforming. The glass or glass-ceramic material may include soda-lime glass, aluminosilicate, boroaluminosilicate or alkali aluminosilicate glass. The glass or glass-ceramic material may be a strengthened glass material, and strengthened can be performed via chemical strengthening.

In one or more embodiments, a method of forming a three-dimensional mirror is provided, the method including forming a three-dimensional mirror substrate according to the embodiments described herein; and disposing a reflective layer on the first major surface.

According to one or more embodiments of this disclosure, a mirror for a HUD system is provided that uses the glass-based preform described herein to form a 3D mirror substrate. The mirror includes a reflective layer on the first major surface of the 3D mirror substrate. The 3D mirror substrate has a first radius of curvature such that the first major surface has a concave shape and the second major surface has a convex shape, where the first radius of curvature is measured with respect to a first axis of curvature. The 3D mirror substrate has a second radius of curvature measured with respect to a second axis of curvature different from the first axis of curvature, where the first axis of curvature is perpendicular to the second axis of curvature. In some embodiments, the first major surface has an aspheric shape.

In another embodiment, a method of forming a three-dimensional (3D) mirror is provided, the method including providing a two-dimensional (2D) mirror preform including a first major surface having an edge with a first chamfer, a second major surface opposite to the first major surface and having an edge with a second chamfer, and a minor surface connecting the first and second major surfaces. The 2D mirror preform is placed on a molding apparatus having a curved support surface with the second major surface facing the curved support surface, and the 2D mirror preform is conformed to the curved support surface to form a curved or 3D mirror substrate having a first radius of curvature.

In one or more embodiments, the conforming of the 2D mirror preform to the curved support surface is performed at a temperature that is less than a glass transition temperature of the preform. A temperature of the mirror substrate may not be raised above the glass transition temperature of the glass-based substrate material during or after the conforming.

In aspects of embodiments of the HUD system, the display unit comprises an LCD, LED, OLED, or LED display panel, and can include a projector.

The glass-based substrate has a thickness that is less than or equal to 3.0 mm; from about 0.5 mm to about 3.0 mm; from about 0.5 mm to about 1.0 mm; from about 1.0 mm to about 3.0 mm; or about 2.0 mm.

As an aspect of some embodiments, the chamfering of the first major surface is configured to reduce edge distortion of the projected image. The chamfering of the first major surface can be configured to reduce an amount of unwanted light reflected toward the user. The projection surface can be a windshield of a vehicle, or a combiner configured to be mounted in a vehicle interior.

The mirror has a first radius of curvature such that the first major surface has a concave shape and the second major surface has a convex shape, the first radius of curvature being relative to a first axis of curvature. The mirror can also have a second radius of curvature that is relative to a second axis of curvature different from the first axis of curvature, where the first axis of curvature is perpendicular to the second axis of curvature. In some preferred embodiments, the first major surface has an aspheric shape.

The first major surface that is reflective comprises a reflective coating on the glass-based substrate, where the reflective coating comprises a metal, a metal oxide, a ceramic oxide, or a metal-ceramic alloy, and can include aluminum or silver. The display unit can include an LCD, LED, OLED, or LED display panel, and/or a projector. The HUD system can further include a projection surface for viewing a projected image by a user of the HUD system, where the display unit configured to produce an image, and the mirror is configured to reflect the image to form the projected image on the projection surface. The projection surface has a shape that is substantially the same as a shape of the mirror, where the projection surface is a windshield or a combiner, and the projection surface can have an aspheric shape.

The glass-based substrate has a thickness that is less than or equal to 3.0 mm; from about 0.5 mm to about 3.0 mm; from about 0.5 mm to about 1.0 mm; from about 1.0 mm to about 3.0 mm; or about 2.0 mm.

Substrate Materials

Suitable glass substrates for mirrors in HUD systems can be non-strengthened glass sheets or can also be strengthened glass sheets. The glass sheets (whether strengthened or non-strengthened) may include soda-lime glass, aluminosilicate, boroaluminosilicate or alkali aluminosilicate glass. Optionally, the glass sheets may be thermally strengthened.

Suitable glass substrates may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass to balance the compressive stress.

Exemplary ion-exchangeable glasses that are suitable for forming glass substrates are soda lime glasses, alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming glass substrates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O)$ 20 mol. % and 0 mol. % $\leq (MgO+CaO) \leq 10$ mol. %.

A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O)$ 18 mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\Sigma modifiers} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\Sigma modifiers} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3$ 2 mol. %; 2 mol. % $\leq Na_2O-Al_2O_3 \leq 6$ mol. %; and 4 mol. % $\leq (Na_2O+K_2O)-Al_2O_3 \leq 10$ mol. %.

The chemically-strengthened as well as the non-chemically-strengthened glass, in some embodiments, can be batched with 0-2 mol. % of at least one fining agent selected from a group that includes $Na_2SO_4$, NaCl, NaF, NaBr, $K_2SO_4$, KCl, KF, KBr, and $SnO_2$.

In one exemplary embodiment, sodium ions in the chemically-strengthened glass can be replaced by potassium ions from the molten bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, glass substrates comprising ion-exchanged glass can possess an array of desired properties, including low weight, high impact resistance, and improved sound attenuation. In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

Suitable glass substrates may be thermally strengthened by a thermal tempering process or an annealing process. The thickness of the thermally-strengthened glass sheets may be less than about 2 mm or less than about 1 mm.

Exemplary glass sheet forming methods include fusion draw and slot draw processes, which are each examples of a down-draw process, as well as float processes. These methods can be used to form both strengthened and non-strengthened glass sheets. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

As discussed in previous paragraphs, an exemplary glass substrate can include a glass sheet of chemically strengthened glass, e.g., Gorilla® Glass. This glass sheet may have been heat treated, ion exchanged and/or annealed. In a laminate structure, the strengthened glass sheet may be an inner layer, and an outer layer may be a non-chemically strengthened glass sheet such as conventional soda lime glass, annealed glass, or the like. The laminate structure can also include a polymeric interlayer intermediate the outer and inner glass layers. The strengthened glass sheet can have a thickness of less than or equal to 1.0 mm and having a residual surface CS level of between about 250 MPa to about 350 MPa with a DOL of greater than 60 microns. In another embodiment the CS level of the strengthened glass sheet is preferably about 300 MPa. Exemplary thicknesses of the glass sheet can range in thicknesses from about 0.3 mm to about 1.5 mm, from 0.5 mm to 1.5 mm to 2.0 mm or more.

In a preferred embodiment, the thin chemically strengthened glass sheet may have a surface stress between about 250 MPa and 900 MPa and can range in thickness from about 0.3 mm to about 1.0 mm. In an embodiment where this strengthened glass sheet is included in a laminate structure, the external layer can be annealed (non-chemically strengthened) glass with a thickness from about 1.5 mm to about 3.0 mm or more. Of course, the thicknesses of the outer and inner layers can be different in a respective laminate structure. Another preferred embodiment of an exemplary laminate structure may include an inner layer of 0.7 mm chemically strengthened glass, a poly-vinyl butyral layer of about 0.76 mm in thickness and a 2.1 mm exterior layer of annealed glass.

In some embodiments, exemplary glass substrates of embodiments discussed herein can be employed in vehicles (automobile, aircraft, and the like) having a Head-up Display (HUD) system. The clarity of fusion formed according to some embodiments can be superior to glass formed by a float process to thereby provide a better driving experience as well as improve safety since information can be easier to read and less of a distraction. A non-limiting HUD system can include a projector unit, a combiner, and a video generation computer. The projection unit in an exemplary HUD can be, but is not limited to, an optical collimator having a convex lens or concave mirror with a display (e.g., optical waveguide, scanning lasers, LED, CRT, video imagery, or the like) at its focus. The projection unit can be employed to produce a desired image. In some embodiments, the HUD system can also include a combiner or beam splitter to redirect the projected image from the projection unit to vary or alter the field of view and the projected image. Some combiners can include special coatings to reflect monochromatic light projected thereon while allowing other wavelengths of light to pass through. In additional embodiments, the combiner can also be curved to refocus an image from the projection unit. Any exemplary HUD system can also include a processing system to provide an interface between the projection unit and applicable vehicle systems from which data can be received, manipulated, monitored and/or displayed. Some processing systems can also be utilized to generate the imagery and symbology to be displayed by the projection unit.

Using such an exemplary HUD system, a display of information (e.g., numbers, images, directions, wording, or otherwise) can be created by projecting an image from the HUD system onto an interior facing surface of a glass-based mirror substrate. The mirror can then redirect the image so that it is in the field of view of a driver.

Exemplary glass substrates according to some embodiments can thus provide a thin, pristine surface for the mirror. In some embodiments, fusion drawn Gorilla Glass can be used as the glass substrate. Such glass does not contain any float lines typical of conventional glass manufactured with the float process (e.g., soda lime glass).

HUDs according to embodiments of the present disclosure can be employed in automotive vehicles, aircraft, synthetic vision systems, and/or mask displays (e.g., head mounted displays such as goggles, masks, helmets, and the like) utilizing exemplary glass substrates described herein. Such HUD systems can project critical information (speed, fuel, temperature, turn signal, navigation, warning messages, etc.) in front of the driver through the glass laminate structure.

According to some embodiments, the HUD systems described herein can use nominal HUD system parameters for radius of curvature, refractive index, and angle of incidence (e.g., radius of curvature $R_c$=8301 mm, distance to source: $R_i$=1000 mm, refractive index n=1.52, and angle of incidence $\theta$=62.08°).

Applicants have shown that the glass substrates and laminate structures disclosed herein have excellent durability, impact resistance, toughness, and scratch resistance. As is well known among skilled artisans, the strength and mechanical impact performance of a glass sheet or laminate is limited by defects in the glass, including both surface and internal defects. When a glass sheet or laminate structure is impacted, the impact point is put into compression, while a ring or "hoop" around the impact point, as well as the opposite face of the impacted sheet, are put into tension. Typically, the origin of failure will be at a flaw, usually on the glass surface, at or near the point of highest tension. This may occur on the opposite face, but can occur within the ring. If a flaw in the glass is put into tension during an impact event, the flaw will likely propagate, and the glass will typically break. Thus, a high magnitude and depth of compressive stress (depth of layer) is preferable.

Due to strengthening, one or both of the surfaces of the strengthened glass sheets disclosed herein are under compression. The incorporation of a compressive stress in a near surface region of the glass can inhibit crack propagation and failure of the glass sheet. In order for flaws to propagate and failure to occur, the tensile stress from an impact must exceed the surface compressive stress at the tip of the flaw. In embodiments, the high compressive stress and high depth of layer of strengthened glass sheets enable the use of thinner glass than in the case of non-chemically-strengthened glass.

The foregoing description of the present disclosure is provided as an enabling teaching thereof and its best, currently-known embodiment. Those skilled in the art will recognize that many changes can be made to the embodiments described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the foregoing description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and may include modification thereto and permutations thereof.

In the foregoing description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be initially claimed as such, one or more features from a claimed combination may in some cases be excised from the combination, and the claimed combination may be directed to a subcombination or variation of a sub-combination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various glass-based structures for head-up displays have been described.

According to an aspect (1) of the present disclosure, a head-up display (HUD) mirror substrate is provided comprising a first major surface with a concave shape, a second major surface opposite to the first major surface and with a convex shape, and a minor surface connecting the first and second major surfaces, wherein the first major surface comprises a first surface roughness Ra of 3 nm or less and a peak to valley (PV) roughness of less than 30 nm, and wherein the mirror substrate comprises a glass or glass-ceramic material.

According to an aspect (2) of the present disclosure, the HUD mirror substrate of aspect (1) is provided, wherein the mirror substrate has an edge that is not cut, shaped, chamfered, or polished while the mirror substrate is in a curved state.

According to an aspect (3) of the present disclosure, the HUD mirror substrate of any of aspects (1)-(2) is provided, wherein the minor surface comprises a cross-sectional edge profile comprising a chamfer.

According to an aspect (4) of the present disclosure, the HUD mirror substrate of aspect (3) is provided, wherein the chamfer is a C chamfer or an R chamfer.

According to an aspect (5) of the present disclosure, the HUD mirror substrate of aspect (4) is provided, wherein the C chamfer is 0.1 mm or greater, or 0.3 mm or greater.

According to an aspect (6) of the present disclosure, the HUD mirror substrate of any of aspects (4)-(5) is provided, wherein the R chamfer is 0.5 mm or greater.

According to an aspect (7) of the present disclosure, the HUD mirror substrate of any of aspects (1)-(6) is provided, wherein the mirror substrate, in a plan view, comprises rounded corners.

According to an aspect (8) of the present disclosure, the HUD mirror substrate of aspect (7) is provided, wherein the rounded corners of the mirror substrate are not shaped or polished while the mirror substrate is in a curved state.

According to an aspect (9) of the present disclosure, the HUD mirror substrate of any of aspects (1)-(8) is provided, wherein the concave surface has an aspheric shape.

According to an aspect (10) of the present disclosure, the HUD mirror substrate of any of aspects (1)-(9) is provided, wherein the convex surface and the concave surface comprise symmetrical chamfers.

According to an aspect (11) of the present disclosure, the HUD mirror substrate of any of aspects (1)-(10) is provided, wherein the mirror substrate has a length from about 200 mm to about 400 mm and a width from about 100 mm to about 250 mm; a length from about 250 mm to about 350 mm and a width from about 100 mm to about 200 mm; a length from about 300 mm to about 350 mm and a width from about 150 mm to about 200 mm; or a length from about 290 mm to about 295 mm and a width from about 130 mm to about 135 mm.

According to an aspect (12) of the present disclosure, the HUD mirror substrate of any of aspects (1)-(11) is provided, wherein the mirror substrate has a contour peak to valley (PV) shape accuracy of less than 100 µm, or less than 50 µm on the concave surface.

According to an aspect (13) of the present disclosure, the HUD mirror substrate of any of aspects (1)-(12) is provided, wherein the mirror substrate has an arithmetic mean waviness Wa of less than 1 µm per 10 mm on the concave surface.

According to an aspect (14) of the present disclosure, the HUD mirror substrate of any of aspects (1)-(13) is provided, wherein convex surface has a surface roughness Ra of less than 30 nm, and a peak to valley (PV) roughness of less than 1 µm.

According to an aspect (15) of the present disclosure, the HUD mirror substrate of aspect (14) is provided, wherein the convex surface has a surface roughness Ra of less than 20 nm, and a peak to valley (PV) roughness of less than 300 nm.

According to an aspect (16) of the present disclosure, the HUD mirror substrate of any of aspects (1)-(15) is provided, wherein the convex surface comprises a ditch-type vacuum hole imprint within 2 mm from the edge of the convex surface.

According to an aspect (17) of the present disclosure, the HUD mirror substrate of aspect (16) is provided, wherein the ditch-type vacuum hole imprint has a depth of less than 1 µm.

According to an aspect (18) of the present disclosure, the HUD mirror substrate of aspect (16) is provided, wherein the convex surface does not have any other vacuum hole imprint other than the ditch-type vacuum hole imprint.

According to an aspect (19) of the present disclosure, the HUD mirror substrate of any of aspects (1)-(15) is provided, 19. The HUD mirror substrate of any one of claims 1-18, wherein the concave surface has a roughness Ra of less than 2 nm or less than 1 nm, and a peak to valley (PV) roughness of less than 20 nm, less than 15 nm, or less than 12 nm.

According to an aspect (20) of the present disclosure, the HUD mirror substrate of any of aspects (1)-(19) is provided, wherein the mirror substrate comprises a thickness defined as a distance between the first and second major surfaces, wherein the thickness is less than or equal to about 3.0 mm, is from about 0.5 mm to about 3.0 mm, is from about 0.5 mm to about 1.0 mm, or is from about 1.0 mm to about 3.0 mm.

According to an aspect (21) of the present disclosure, the HUD mirror substrate of any of aspects (1)-(20) is provided, wherein the glass or glass-ceramic material comprises soda-lime glass, aluminosilicate, boroaluminosilicate or alkali aluminosilicate glass.

According to an aspect (22) of the present disclosure, the HUD mirror substrate of any of aspects (1)-(21) is provided, wherein the glass or glass-ceramic material is a strengthened glass material.

According to an aspect (23) of the present disclosure, the HUD mirror substrate of aspect (22) is provided, wherein the glass or glass-ceramic material is chemically strengthened.

According to an aspect (24) of the present disclosure, a three-dimensional HUD mirror is provided comprising the HUD mirror substrate of any of aspects (1)-(23) and a reflective layer disposed on the first major surface of the mirror substrate.

According to an aspect (25) of the present disclosure, a method of forming a three-dimensional mirror is provided. The method comprising: providing a mirror preform comprising a first major surface, a second major surface opposite to the first major surface, and a minor surface connecting the first and second major surfaces, the mirror preform comprising a glass or glass-ceramic material, and the first and second major surfaces being two-dimensional; disposing the mirror preform on a molding apparatus having a curved support surface such that the second major surface is facing the curved support surface; and conforming the mirror preform to the curved support surface to form a curved mirror substrate having a convex surface corresponding to the second major surface and a concave surface corresponding to the first major surface, the concave surface having a first radius of curvature, wherein, after the step of conforming, the concave surface has a roughness Ra of less than 3 nm and a peak to valley (PV) roughness of less than 30 nm.

According to an aspect (26) of the present disclosure, the method of aspect (25) is provided, wherein the curved mirror substrate has an edge that is not cut, shaped, chamfered, or polished during or after the step of conforming.

According to an aspect (27) of the present disclosure, the method of any of aspects (25)-(26) is provided, wherein the minor surface comprises a cross-sectional edge profile that is identical to a cross-sectional edge profile of the curved mirror substrate.

According to an aspect (28) of the present disclosure, the method of any of aspects (25)-(27) is provided, wherein an edge profile of the mirror preform comprises a chamfer on at least one of a first major surface-side of the minor edge and a second major surface-side of the minor edge.

According to an aspect (29) of the present disclosure, the method of aspect (28) is provided, wherein the chamfer is a C chamfer or an R chamfer.

According to an aspect (30) of the present disclosure, the method of aspect (29) is provided, wherein the C chamfer is 0.1 mm or greater, or 0.3 mm or greater.

According to an aspect (31) of the present disclosure, the method of any of aspects (25)-(30) is provided, wherein the R chamfer is 0.5 mm or greater.

According to an aspect (32) of the present disclosure, the method of any of aspects (25)-(31) is provided, wherein a surface roughness of the minor surface after the step of conforming is within 2% of the surface roughness of the minor surface prior to the step of conforming.

According to an aspect (33) of the present disclosure, the method of aspect (32) is provided, wherein the surface roughness of the minor surface after the step of conforming is identical to the surface roughness of the minor surface prior to the step of conforming.

According to an aspect (34) of the present disclosure, the method of any of aspects (25)-(33) is provided, wherein the mirror preform, when viewed in a plan view, comprises rounded corners.

According to an aspect (35) of the present disclosure, the method of aspect (34) is provided, wherein the curved mirror substrate comprises rounded corners identical to the rounded corners of the mirror preform.

According to an aspect (36) of the present disclosure, the method of aspect (35) is provided, wherein the rounded corners of the curved mirror substrate are not shaped or polished during or after the step of conforming.

According to an aspect (37) of the present disclosure, the method of any of aspects (25)-(36) is provided, further comprising processing the minor surface of the two-dimensional mirror preform to achieve a predetermined edge profile of the curved mirror substrate, the processing comprising at least one of cutting, chamfering, or polishing.

According to an aspect (38) of the present disclosure, the method of any of aspects (25)-(37) is provided, wherein the concave surface has an aspheric shape.

According to an aspect (39) of the present disclosure, the method of any of aspects (25)-(38) is provided, wherein the convex surface and the concave surface comprise symmetrical chamfers.

According to an aspect (40) of the present disclosure, the method of any of aspects (25)-(39) is provided, wherein the curved mirror substrate has a length from about 200 mm to about 400 mm and a width from about 100 mm to about 250 mm; a length from about 250 mm to about 350 mm and a width from about 100 mm to about 200 mm; a length from about 300 mm to about 350 mm and a width from about 150 mm to about 200 mm; or a length from about 290 mm to about 295 mm and a width from about 130 mm to about 135 mm.

According to an aspect (41) of the present disclosure, the method of any of aspects (25)-(40) is provided, wherein the curved mirror substrate has a contour peak to valley (PV) shape accuracy of less than 100 μm, or less than 50 μm on the concave surface.

According to an aspect (42) of the present disclosure, the method of any of aspects (25)-(41) is provided, wherein the curved mirror substrate has an arithmetic mean waviness Wa of less than 1 μm per 10 mm on the concave surface.

According to an aspect (43) of the present disclosure, the method of any of aspects (25)-(42) is provided, wherein the curved mirror substrate has a maximum roughness depth Rmax of less than 30 nm on the concave surface.

According to an aspect (44) of the present disclosure, the method of any of aspects (25)-(43) is provided, wherein convex surface has a surface roughness Ra of less than 30 nm, and a peak to valley (PV) roughness of less than 1 μm.

According to an aspect (45) of the present disclosure, the method of aspect (44) is provided, wherein the convex surface has a surface roughness Ra of less than 20 nm, and a peak to valley (PV) roughness of less than 300 nm.

According to an aspect (46) of the present disclosure, the method of any of aspects (25)-(45) is provided, wherein the curved support surface comprises a ditch-type vacuum hole.

According to an aspect (47) of the present disclosure, the method of aspect (46) is provided, wherein, when the mirror preform is disposed on the molding apparatus, the ditch-type vacuum hole is within 2 mm of an edge of the second major surface.

According to an aspect (48) of the present disclosure, the method of any of aspects (25)-(47) is provided, wherein, after the step of conforming, the convex surface comprises a ditch-type vacuum hole imprint within 2 mm from the edge of the convex surface along an entirety of the edge.

According to an aspect (49) of the present disclosure, the method of aspect (48) is provided, wherein the ditch-type vacuum hole imprint has a depth of less than 1 μm.

According to an aspect (50) of the present disclosure, the method of any of aspects (48)-(49) is provided, wherein the convex surface does not have any other vacuum hole imprint other than the ditch-type vacuum hole imprint.

According to an aspect (51) of the present disclosure, the method of any of aspects (25)-(50) is provided, wherein the concave surface has a roughness Ra of less than 2 nm or less than 1 nm, and a peak to valley (PV) roughness of less than 20 nm, less than 15 nm, or less than 12 nm.

According to an aspect (52) of the present disclosure, the method of any of aspects (25)-(51) is provided, wherein the mirror preform comprises a thickness defined as a distance between the first and second major surfaces, wherein the thickness is less than or equal to about 3.0 mm, is from about 0.5 mm to about 3.0 mm, is from about 0.5 mm to about 1.0 mm, or is from about 1.0 mm to about 3.0 mm.

According to an aspect (53) of the present disclosure, the method of any of aspects (25)-(52) is provided, wherein the step of conforming is performed at a temperature that is less than a glass transition temperature of the mirror preform.

According to an aspect (54) of the present disclosure, the method of any of aspects (25)-(53) is provided, wherein a temperature of the mirror preform or the curved mirror substrate is not raised above the glass transition temperature of the mirror preform during or after the step of conforming.

According to an aspect (55) of the present disclosure, the method of any of aspects (25)-(54) is provided, wherein the glass or glass-ceramic material comprises soda-lime glass, aluminosilicate, boroaluminosilicate or alkali aluminosilicate glass.

According to an aspect (56) of the present disclosure, the method of any of aspects (25)-(55) is provided, wherein the glass or glass-ceramic material is a strengthened glass material.

According to an aspect (57) of the present disclosure, the method of aspect (56) is provided, wherein the glass or glass-ceramic material is chemically strengthened.

According to an aspect (58) of the present disclosure, a method of forming a three-dimensional mirror is provided, comprising: forming a three-dimensional mirror substrate according to the method of any of aspects (25)-(57); and disposing a reflective layer on the first major surface.

While preferred embodiments of the present disclosure have been described, it is to be understood that the embodiments described are illustrative only and that the scope of the present disclosure is to be defined solely by the appended claims when accorded a full range of equivalence, many variations and modifications naturally occurring to those of skill in the art from a perusal hereof.

The invention claimed is:

1. A head-up display (HUD) mirror substrate comprising a first major surface with a concave shape, a second major surface opposite to the first major surface and with a convex shape, and a minor surface connecting the first and second major surfaces,
   wherein the first major surface comprises a first surface roughness Ra of 3 nm or less and a peak to valley (PV) roughness of less than 30 nm, and
   wherein the mirror substrate comprises a glass or glass-ceramic material,
   wherein the convex surface has a surface roughness Ra of less than 30 nm, and a peak to valley (PV) roughness of less than 1 μm.

2. The HUD mirror substrate of claim 1, wherein the mirror substrate is not cut, shaped, chamfered, or polished while the mirror substrate is in a curved state.

3. The HUD mirror substrate of claim 2, wherein the mirror substrate, in a plan view, comprises rounded corners.

4. The HUD mirror substrate of claim 1, wherein the minor surface comprises a cross-sectional edge profile comprising a chamfer, wherein the chamfer is a C-chamfer or an R-chamfer, wherein, when the chamfer is a C-chamfer, the chamfer comprises a length that is 0.1 mm or greater, wherein, when the chamfer is an R-chamfer, the chamfer comprises a length that is greater than or equal to 0.5 mm.

5. The HUD mirror substrate of claim 1, wherein the concave surface has an aspheric shape.

6. The HUD mirror substrate of claim 1, wherein the convex surface and the concave surface comprise symmetrical chamfers.

7. The HUD mirror substrate of claim 1, wherein the mirror substrate has a length from about 200 mm to about 400 mm and a width from about 100 mm to about 250 mm.

8. The HUD mirror substrate of claim 1, wherein the mirror substrate has a contour peak to valley (PV) shape accuracy of less than 100 μm, or less than 50 μm on the concave surface.

9. The HUD mirror substrate of claim 1, wherein the mirror substrate has an arithmetic mean waviness Wa of less than 1 μm per 10 mm on the concave surface.

10. The HUD mirror substrate of claim 1, wherein the convex surface has a surface roughness Ra of less than 20 nm, and a peak to valley (PV) roughness of less than 300 nm.

11. The HUD mirror substrate of claim 1, wherein the convex surface comprises a ditch-type vacuum hole imprint within 2 mm from the edge of the convex surface.

12. The HUD mirror substrate of claim 11, wherein the ditch-type vacuum hole imprint has a depth of less than 1 μm.

13. The HUD mirror substrate of claim 11, wherein the convex surface does not have any other vacuum hole imprint other than the ditch-type vacuum hole imprint.

14. The HUD mirror substrate of claim 1, wherein the concave surface has a roughness Ra of less than 2 nm or less than 1 nm, and a peak to valley (PV) roughness of less than 20 nm, less than 15 nm, or less than 12 nm.

15. The HUD mirror substrate of claim 1, wherein the mirror substrate comprises a thickness defined as a distance between the first and second major surfaces, wherein the thickness is from about 0.5 mm to about 3.0 mm.

16. The HUD mirror substrate of claim 1, wherein the glass or glass-ceramic material comprises soda-lime glass, aluminosilicate, boroaluminosilicate or alkali aluminosilicate glass.

17. A three-dimensional HUD mirror comprising:
   the HUD mirror substrate of claim 1 and
   a reflective layer disposed on the first major surface of the mirror substrate.

18. A method of forming a three-dimensional mirror, the method comprising:
   providing a mirror preform comprising a first major surface, a second major surface opposite to the first major surface, and a minor surface connecting the first and second major surfaces, the mirror preform comprising a glass or glass-ceramic material, and the first and second major surfaces being two-dimensional;
   disposing the mirror preform on a forming surface of a mold such that the second major surface is facing the forming surface; and
   conforming the mirror preform to the forming surface to form a curved mirror substrate having a convex surface corresponding to the second major surface and a concave surface corresponding to the first major surface, the concave surface having a first radius of curvature, wherein, after the step of conforming, the concave surface has a roughness Ra of less than 3 nm and a peak to valley (PV) roughness of less than 30 nm.

* * * * *